United States Patent
Fink et al.

(10) Patent No.: US 7,311,962 B2
(45) Date of Patent: Dec. 25, 2007

(54) METHOD OF FORMING REFLECTING DIELECTRIC MIRRORS

(75) Inventors: Yoel Fink, Cambridge, MA (US); Shandon Hart, Cambridge, MA (US); Garry Maskaly, North Quincy, MA (US); Burak Temelkuran, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/196,403

(22) Filed: Jul. 16, 2002

(65) Prior Publication Data

US 2003/0031852 A1 Feb. 13, 2003

Related U.S. Application Data

(60) Provisional application No. 60/351,066, filed on Jan. 23, 2002, provisional application No. 60/305,839, filed on Jul. 16, 2001.

(51) Int. Cl.
*B32B 3/26* (2006.01)
(52) U.S. Cl. .............. 428/216; 428/430; 428/441; 428/442; 428/426; 385/124; 385/104; 385/126
(58) Field of Classification Search ............ 428/426, 428/430, 441, 442, 216; 385/124, 104, 126
See application file for complete search history.

(56) References Cited

U.S. PATENT DOCUMENTS 3,659,915 A 5/1972 Maurer et al.
4,076,380 A * 2/1978 DiMarcello et al. ........ 385/124
4,099,835 A * 7/1978 French et al. ............... 385/124
4,478,486 A 10/1984 Fentress et al.
4,688,893 A 8/1987 Laakmann
4,930,863 A 6/1990 Croitoriu et al.
5,239,176 A * 8/1993 Stevenson .............. 250/227.25
5,497,440 A 3/1996 Croitoriu et al.
5,533,161 A 7/1996 Atkeisson et al.
5,729,646 A 3/1998 Miyagi et al.
5,815,627 A 9/1998 Harrington
5,935,491 A 8/1999 Tripathy et al.
6,130,780 A 10/2000 Joannopoulos et al.
6,172,810 B1 1/2001 Fleming et al.

(Continued)

FOREIGN PATENT DOCUMENTS

| DE | 39 42 556 | 6/1991 |
|---|---|---|
| EP | 0 844 501 | 5/1998 |
| GB | 1198904 | 5/1968 |

(Continued)

OTHER PUBLICATIONS

"New Oriented Polymer/Thermoplastic Glass Composites for IR Optics," Bormashenko et al. *Advanced Engineering Materials.* 2000. No. 10.

(Continued)

*Primary Examiner*—Elizabeth M. Cole
(74) *Attorney, Agent, or Firm*—Fish & Richardson P.C.

(57) ABSTRACT

A mirror structure includes a plurality of features of a defined size. The features include alternating spatial units of a chalcogenide glass and a thermoplastic polymer, and are specifically arranged in an ordered form so that the structure is highly reflective. Thermally-assisted methods are introduced for forming such structures.

26 Claims, 6 Drawing Sheets

U.S. PATENT DOCUMENTS

| | | |
|---|---|---|
| 6,404,966 B1 | 6/2002 | Kawanishi et al. |
| 6,463,200 B2 | 10/2002 | Fink et al. |
| 6,606,440 B2 | 8/2003 | Hasegawa et al. |
| 6,735,369 B2 | 5/2004 | Komachi et al. |
| 6,985,661 B1 | 1/2006 | Russell et al. |
| 2002/0164137 A1 | 11/2002 | Johnson et al. |
| 2003/0044158 A1 | 3/2003 | King et al. |

FOREIGN PATENT DOCUMENTS

| | | |
|---|---|---|
| WO | WO 99/47465 | 9/1999 |
| WO | WO99/47465 | 9/1999 |
| WO | WO 00/22466 | 4/2000 |
| WO | WO 00/46287 | 8/2000 |
| WO | WO 02/41050 | 5/2002 |
| WO | WO 02/061467 | 8/2002 |
| WO | WO 02/072489 | 9/2002 |
| WO | WO 03/079073 | 9/2003 |
| WO | WO 03/079077 | 9/2003 |

OTHER PUBLICATIONS

"Development of new near-infrared filters based on the 'sandwich' polymer-chalcogenide glass-polymer composites," Bormashenko et al. *Society of Photo-Optical Instrumentation Engineers*. May 2001.

"Optical Properties and infrared optics applications of composite films based on polyethylene and low-melting-point chalcogenide," Bormashenko et al. *Society of Photo-Optical Instrumentation Engineers*. Feb. 2002.

Bormashenko, Edward et al. "Development of new near-infrared filters based on the "sandwich" polymer-chalcogenide glass-polymer composites." *Optical Engineering*. 40:5, 661-662, May 2001.

Allan et al. "Photonic crystal fibers: effective-index and band-gap guidance." Photonic Crystals and Light Localization in the 21st Century. 2001: Kluwer.

Barkou et al. "Silica-air photonic crystal fiber design that permits waveguiding by a true photonic bandgap effect." Optics Letters, 24:1, Jan. 1, 1999, pp. 46-48.

Baumeister, P. "the transmission and degree of polarization of quarter-wave stacks at non-normal incidence." Opt. Acta, 8, 1961, pp. 105-119.

Birks et al. "Full 2-D photonic bandgaps in silica/air structures." Electronic Letters, 31:22, Oct. 26, 1995, pp. 1941-1943.

Bormashenko et al. "Development of new-near-infrared filters based on the 'sandwich'polymer-chalcogenide glass-polymer composites." Optical Engineering, 40:5, 2001, pp. 661-662.

Bormashenko et al. "New Oriented Polymer/Thermoplastic Glass Composites for IR Optics." Engineering Materials, 10, 2000, pp. ?-?.

Bormashenko et al. "Optical Properties and infrared optics applications of composite films based on polyethylene and low-melting-point chalcogendie." Society of Photo-Optical Instrumentation Engineers, Feb. 2002.

Bornstein et al. "Chalcogenide Hollow Fibers." Journal of Non-Crystalline Solids, 77:8, 1985, pp. 1277-1280.

Broeng et al. "Analysis of air-guiding photonic bandgap fibers." Optics Letters, 25:2, 2000, pp. 96-98.

Cregan et al. "Single-Mode Photonic Band Gap Guidance of Light in Air." Science, 285, Sep. 3, 1999, pp. 1537-1539.

Dai et al. "High-peak-power, pulsed $CO_2$ laser light delivery by hollow glass waveguides." Appl Optics, 36, 1997, pp. 5072-5077.

De Sterke et al. "Differential losses in Bragg fibers." J. Appl. Phys., 76:2, Jul. 15, 1994, pp. 680-688.

Eggleton et al. Microstructured optical fiber devices. Optics Express, 9:13, 2001, pp. 698-713.

Feigel A. et al. "Chalcogenide glass-based three-dimensional photonic crystals." Applied Physics Letters, 77:20, pp. 3221-3223, Nov. 13, 2000.

Fink et al. "A dielectric omnidirectional reflector." Science, 282:5394, 1998, pp. 1679-1682.

Fink et al. "Guiding Optical Light in Air Using an All-Dielectric Structure." Journal of Lightwave Technology, 17:11, Nov. 11, 1999, pp. 2039-2041.

Fitt et al. "Modeling the fabrication of hollow fibers: Capillary drawings." Journal of Lightwave Technology, 19:12, 2001, pp. 1924-1931.

Gopal et al. "Deposition and characterization of metal sulfide dielectric coatings for hollow glass waveguide." Optical Society of America, 2003. Optics Express, 11:24, Dec. 1, 2003.

Harrington, J.A. "Infrared Fibers in Handbook of Optics." McGraw-Hill, 2001, pp. 14, 1-14, 13.

Harrington, James. "A Review of IR Transmitting, Hollow Waveguides." Fiber and Integrated Optics, 19, 2000, pp. 211-217.

Hart et al. "External Reflection from Omnidirectional Dielectric Mirror Fibers." Science, 296, Apr. 19, 2002, pp. 510-513.

Hilton, A.R., "Optical Properties of Chalcogenide Glasses." Journal of Non-Crystalline Solids, 2, 1970, pp. 28-39.

Hongo et al. "Transmission of Kilowatt-Class Co2-Laser Light through Dielectric-Coated Metallic Hollow Wave-Guides for Material Processing." Applied Optics, 31:24, 1992. pp. 5114-5120.

Ibanescu et al. "An all-dielectric coaxial waveguide." Science, 289:5478, 2000, pp. 415-419.

Ibanescu et al. "Analysis of Mode Structure in OmniGuide Fibers." Physical Review E, 67:4, 2003.

John, S. "Strong Localization of Photons in Certain Disordered Dielectric Superlattices." Physical Review Letters, 58:23, 1987, pp. 2486-2486.

Johnson et al. "Low-loss asymptotically single-mode propagation in large-core OmniGuide fibers." Optics Express, 9:13, 2001, pp. 748-779.

Keck et al. "On the ultimate lower limit of attenuation in glass optical waveguides." Applied Physics Letters, 22:7, 1973, pp. 307-309.

King et al"Laboratory preparation of highly pure $As_2Se_3$ glass." J. Non-Cryst. Sol., 181, 1995, pp. 231-237.

Knight et al. "Photonic Band Gap Guidance in Optical Fibers." Science, 282, Nov. 20, 1998, pp. 1476-1478.

Kucuk et al. "An estimation of the surface tension for silicate glass melts at 1400° C. using statistical analysis." Glass Technol., 40, 1999, pp. 149-153.

Mahlein. Generalized Brewster-angle conditions for quarter-wave multilayers at non-normal incidence. J. Opt. Soc. Am., 64, 1974, pp. 647-352.

Marcatilli et al. "Hollow metallic and dielectric waveguides for long distance optical transmission and lasers." Bell Syst. Tech. J., 43, 1964, pp. 1783-1809.

Mossadegh R. et al. "Fabrication of single-mode chalcogenide optial fiber." Journal of Lightwave Technology, 16:2, pp. 214-216, Feb. 1998.

Matsuura et al. "Hollow infrared fibers fabricated by glass-drawing technique." Optics Express, 10:12, 2002, pp. 488-492.

Matsuura et al. "Small-bore hollow waveguide for delivery of near singlemode IR laster radiation." Electronic Letters, 30, 1994, pp. 1688-1690.

Maurer et al. "Fused silica optical waveguide." Corning Glass Works, 1972.

Mitra et al. "Nonlinear limits to the information capacity of optical fibre communications." Nature, 411, 2001, pp. 1027-1030.

Miyagi et al. "Design Theory of Dielectric-Coated Circular Metallic Waveguides for Infrared Transmission." Journal of Lightwave Technology, 2:2, 1984, pp. 116-126.

Monro, T.M. et al. "Chalcogenide Holey Fibres." Electronics Letters, 36:24, pp. 1998-2000, Nov. 23, 2000.

Nishii, J. et al. "Chalcogenide glass fiber with a core-cladding structure." Applied Optics, 28: 23, pp. 5122-5127, Dec. 1, 1989.

Nubling et al. "Hollow-waveguide delivery systems for high-power, industrial $CO_2$ lasers." Applied Optics, 34:3, Jan. 20, 1996, pp. 372-380.

Ouyang et al. "Comparitive study of air-core and coaxial Bragg fibers: single-mode transmission and dispersion characteristics." Optics Express, 9:13, 2001, pp. 733-747.

Pottage et al. "Robust photonic band gaps for hollow core guidance in PCF made from high index glass." Optics Express, 11:22, Nov. 3, 2003, pp. 2854-2861.

Renn et al. "Laser-Guided Atoms in Hollow-Core Optical Fibers." Physical Review Letters, 75:18, 1995, pp. 3253-3256.

Rundquist et al. "Phase-matched generation of coherent soft-X-rays." Science, 280:5368, 1998, pp. 1412-1415.

Sanghera et al. "Active and passive chalcogenide glass optical fibers for IR applications: a review." Journal of Non-Crystalline Solids, 257, 1999, pp. 6-16.

Sanghera, J.S. et al. "Development and infrared applications of chalcogenide class optial fibers." Fiber and Integrated Optics, 19:3, pp. 251-274, Mar. 1, 2000.

Sanghera, J.S. et al. "Fabrication of long lengths of low-loss IR transmitting AS40S (60-X) sex glass fibers." Journal of Lightwave Technology, 14:5, pp. 743-748, May 1, 1996.

Seddon, A.B. "Chalcogenide glasses: a review of their preparation, properties and applications." J. Non-Cyrst. Sol., 184, 1995, pp. 44-50.

Temelkuran et al. "Wavelength-scalable hollow optical fibres with large photonic bandgaps for $CO_2$ laser transmission." Nature, 420, Dec. 12, 2002, pp. 650-653.

Temelkuran et al. "Low-loss infrared dielectric materials system for broadband dual-rang omnidirectional reflectivity." Optics Letters, 26, 2001, pp. 1370-1372.

Varsheneya A.K. Fundamentals of Inorganic Glasses, Academic Press, San Diego, pp. 5-7, 1994.

Varshneya, A. K. "Some comments on physical properties of chalcogenide glasses." J. Non-Cryst. Sol., 273, 2000, pp. 1-7.

Vienne et al. "First demonstration of air-silica Bragg fiber." Optical Society of America, 2003. Institute of Electrical and Electronics Engineers. Optical Fiber Communication Conference and Exposition Postdeadline Papers.

Weber et al. Giant Birefringent Optics in Multilayer Polymer Mirrors. Science, 287, 2000, pp. 2451-2457.

Winn et al. Omnidirectional reflection from a one-dimensional photonic crystal. Optics Letters, 23, 1998, pp. 1573-1575.

Yablonovitch. E. "Inhibited Spontaneous Emission in Solid-State Physics and Electronics." Physical Review Letters, 58:20, 1987, pp. 2059-2062.

Yeh et al. "Theory of Bragg Fiber." Journal of the Optical Society of America, 68:9, 1978, pp. 1196-1201.

Yeh et al. Electromagnetic propagation in periodic stratified media. I. General theory. J. Opt. Soc. Am., 67, 1977, pp. 423-438.

* cited by examiner

METHOD OF FORMING REFLECTING DIELECTRIC MIRRORS

PRIORITY INFORMATION

This application claims priority from provisional application Ser. No. 60/305,839 filed Jul. 16, 2001 and provisional application Ser. No. 60/351,066 filed Jan. 23, 2002.

This invention was made with government support under Grant No. DAAD19-01-1-0647 awarded by the Army Research Office and Grant Number ECS-0123460 awarded by the NSF. The government has certain rights in the invention.

BACKGROUND OF THE INVENTION

The invention relates to the field of optics, and in particular to the creation of reflecting dielectric mirror structures, such as fibers.

Polymer fibers have become ubiquitous in applications such as textile fabrics, due to their excellent mechanical properties and availability of low-cost, high-volume processing techniques. However, the control over their optical properties has so far remained relatively limited. Conversely, dielectric mirrors are used to precisely control and manipulate light in high performance optical applications, but fabrication of these fragile mirrors has been mostly restricted to planar geometries and remains costly. Planar dielectric mirrors, also known as one-dimensional photonic crystals, can exhibit highly efficient reflection of electromagnetic (EM) radiation and precise frequency selectivity. Advances in vapor deposition technology have enabled a high degree of control over film layer thicknesses, resulting in an ability to control the spectral systems, laser resonator components, or simple high efficiency reflectors. Unlike metallic mirrors, which typically absorb a few percent of any incident light, dielectric mirrors can be fabricated with external reflectivities approaching 100%.

A typical dielectric mirror is a planar stack of dielectrics made of two alternating materials with different refractive indices. Although these mirrors do not possess a complete photonic band gap, it has recently been shown that they can be designed to reflect light of all incidence angles and polarizations across broad, selectable frequency ranges. This advance has inspired interest in the utilization of omnidirectional dielectric mirrors in applications requiring strong confinement or reflection of light at many angles, such as optical cavities or hollow waveguides.

The degree of utilization of all types of dielectric mirrors has been impeded by cost and complexity associated with their fabrication, which typically involves physical or chemical vapor deposition of many alternating layers in sequence, and by difficulties associated with depositing these mirrors on non-planar surfaces. In addition, the mirror films are typically fragile and not freestanding.

SUMMARY OF THE INVENTION

According to one aspect of the invention, there is provided a mirror structure. The mirror structure includes a plurality of features of a defined size. The features include alternating spatial units of a chalcogenide glass and a thermoplastic polymer, and are specifically arranged in an ordered form so that the structure is highly reflective.

According to another aspect of the invention, there is provided a method of forming a mirror structure. The method includes forming a plurality of features of a defined size. The features include alternating spatial units of a chalcogenide glass and a thermoplastic polymer. The method further includes specifically arranging the features in an ordered form so that the structure is highly reflective.

According to another aspect of the invention, there is provided a mirror structure. The mirror structure includes a plurality of features of a defined size. The features includes multiple spatial units of a chalcogenide glass and a thermoplastic polymer. Also, the spatial units are of size between 1 nanometer and 20000 nanometers.

According to another aspect of the invention, there is provided a method of forming a mirror structure. The method includes forming a plurality of features of a defined size. A plurality of spatial units of a chalcogenide glass and a thermoplastic polymer are formed on each of said features. Also, the spatial units are of size between 1 nanometer and 20000 nanometers. According to yet another aspect of the invention, there is provided a mirror structure. The mirror structure includes a plurality of layers of a thermoplastic polymer of a defined size, and a plurality of layers of chalcogenide glass of a defined size. The layers of thermoplastic polymer and chalcogenide glass are arranged in an ordered form so that the structure is highly reflective.

In yet another aspect of the invention, there is provided a method of forming a mirror structure. The method includes forming a plurality of layers of a polymer plastic of a defined size, and a plurality of layers of chalcogenide glass of a defined size. The layers of thermoplastic polymer and chalcogenide glass are arranged in an ordered form. At some point in the forming process, the thermoplastic polymer and chalcogenide glass are thermally co-processed simultaneously in order to form the mirror structure. In one representation, the layers of thermoplastic polymer and chalcogenide glass are rolled or stacked, and at a specific temperature the layers of polymer plastic and chalcogenide glass are thermally drawn together or bonded so that the resulting structure is highly reflective.

DETAILED DESCRIPTION OF THE INVENTION

The invention combines some of the advantages of two dissimilar materials in the fabrication of polymeric fibers having on or within them a multilayer dielectric mirror structure. Thermal processing techniques are used to create and then reduce a macroscopic layered dielectric structure to sub-micron length scales, thus establishing a photonic band gap in the mid-IR range. The selection of materials involves the empirical identification of a pair of amorphous materials, such as poly(ether-sulfone)(PES) and arsenic triselenide ($As_2Se_3$), which have substantially different refractive indices yet have similar thermo-mechanical properties within a certain thermal processing window. Amorphous materials, such as inorganic glasses and some thermoplastic polymers, have gradual variation in viscosity with temperature when compared to crystalline materials. This is due to the lack of a first-order-thermodynamic transition in an amorphous material as it is cooled from a melt to the glassy state. The absence of a first-order transition implies a corresponding continuous variation in free volume and configuration entropy, which are controlling factors in viscosity; thus the viscosity does not vary abruptly with changing temperature. This continuous viscosity variation is one of the most important factors that allows inorganic glasses and organic thermoplastics to be formed by high-speed thermal processes, such as drawing, blowing, pressing, and extrusion.

There are serious difficulties in property matching that must be considered in order to utilize similar viscous thermal processes in the fabrication of omnidirectional mirror structures. The selected materials should have low optical absorption over a wide, common wavelength band. They should have very similar or controllable viscosities at the processing temperatures of interest so that the layers precisely maintain the desired relative thicknesses ratio. In addition, the layers must adhere strongly and must not delaminate, even when subjected to thermal quenching.

One of the advantages of using $As_2Se_3$ is that not only is it a stable glass, but it is also a stoichiometric compound that can be readily deposited in thin films through thermal evaporation or sputtering without dissociation. Additionally, $As_2Se_3$ is transparent to IR radiation from approximately 0.8 to 17 μm, and has refractive index of approximately 2.8 in the mid-IR range. PES is a high performance, dimensionally stable thermoplastic with a refractive index of 1.55 and good transparency to EM waves in a range extending from the visible regime into the mid-IR. It can be expected that the property matching described hereinbefore can be further optimized through selective adjustment of polymer and glass compositions. Other materials combinations involving various chalcogenides, oxides, halides, or polymers could be potentially used to achieve similar results.

Figure 1:
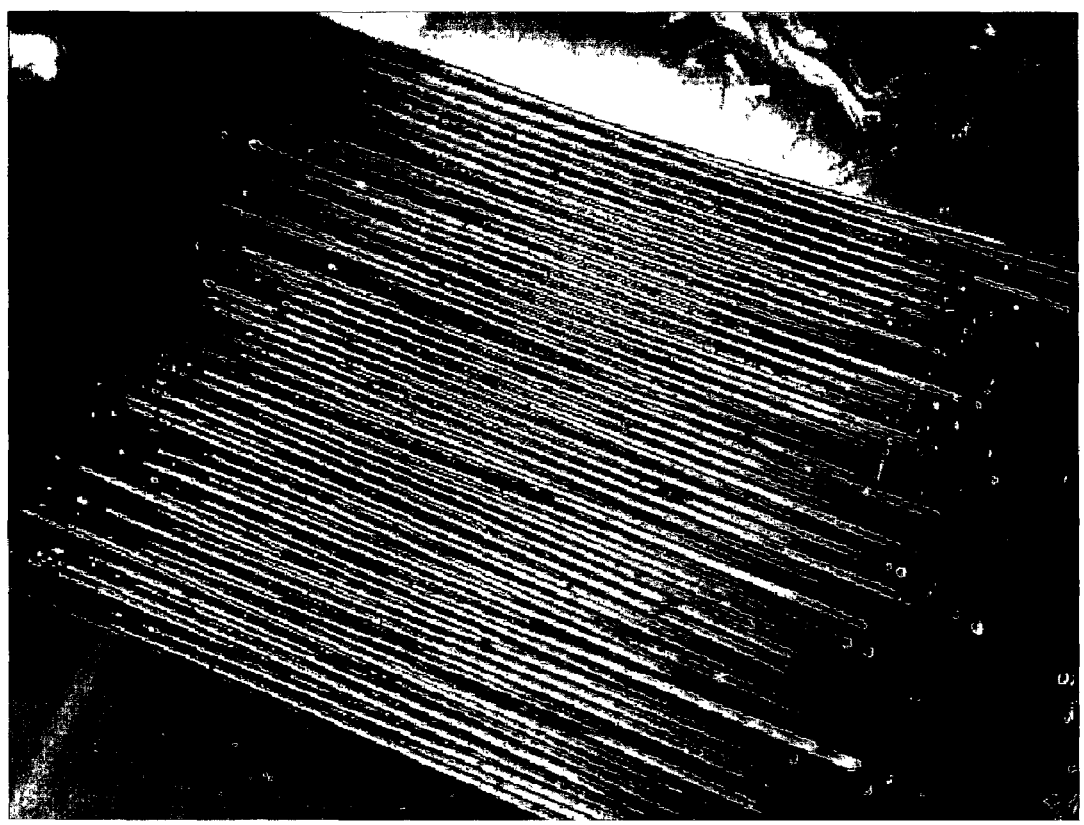
FIG. 1 is a photograph of a 200 μm OD fibers that are formed using selected materials in accordance with the invention.

FIG. 1 is a photograph of fibers that are formed using the selected materials in accordance with the invention. In this embodiment, the selected materials are used to construct a multilayer preform rod, which essentially is a macro-scale version of the final fiber. In order to fabricate the dielectric mirror fiber preform, an $As_2Se_3$ film is deposited through thermal evaporation on either side of a freestanding PES film. The PES film has a thickness between 0.1-10,000 μm. This large film is then rolled by hand onto the exterior of a 25 cm long hollow PES rod with an outer diameter (OD) of 2 cm in order to create a structure having approximately 20 alternating layers of PES and $As_2Se_3$. In this way, a periodic dielectric structure with 20 or more layers is fabricated, yet only one vapor deposition step is strictly required. The layers of PES and $As_2Se_3$ form features of the same size and dimensions. These features are specifically arranged in an ordered form. The dielectric structure is consolidated into a solid preform through heating in a vacuum oven at a low pressure and an elevated temperature.

In particular, the dielectric structure has a certain order or design that the materials form features in a regular, controlled fashion. The features can consist of spatial units of a chalcogenide glass and a thermoplastic polymer, and can have an engineered structure with periodic, pseudo-periodicity, or there can be no strict periodicity, but the features are nevertheless purposefully arranged. The essential point is that the feature arrangement of the materials in the final structure is not random or probabilistic, but is engineered or designed using techniques described hereinafter. The spatial units can have dimensional sizes between 1-20000 nanometers.

The resulting multilayer fiber preform is subsequently thermomechanically drawn down using an optical fiber draw tower into hundreds of meters of multilayer fiber with sub-micron layer thickness, thus establishing a photonic bandgap in the mid-IR range. Fibers of varying outer diameters from 175-500 μm with a typical standard deviation of 10 μm from target are drawn from the same preform to demonstrate adjustment of the reflectivity spectra through thermal deformation. The spectral position of the photonic band gap is precisely controlled by the optical monitoring of the outer diameter (OD) of the fiber during draw, which is later verified by reflectivity measurements on single and multiple fibers of different diameters. Using multiple preforms, various fibers can also be drawn having the same diameter, but completely different spectral signatures. The resulting dielectric mirror fibers exhibit reflectivity at selectable IR wavelength ranges that matches or exceeds the reflectivity of gold-coated fibers.

Figure 2:
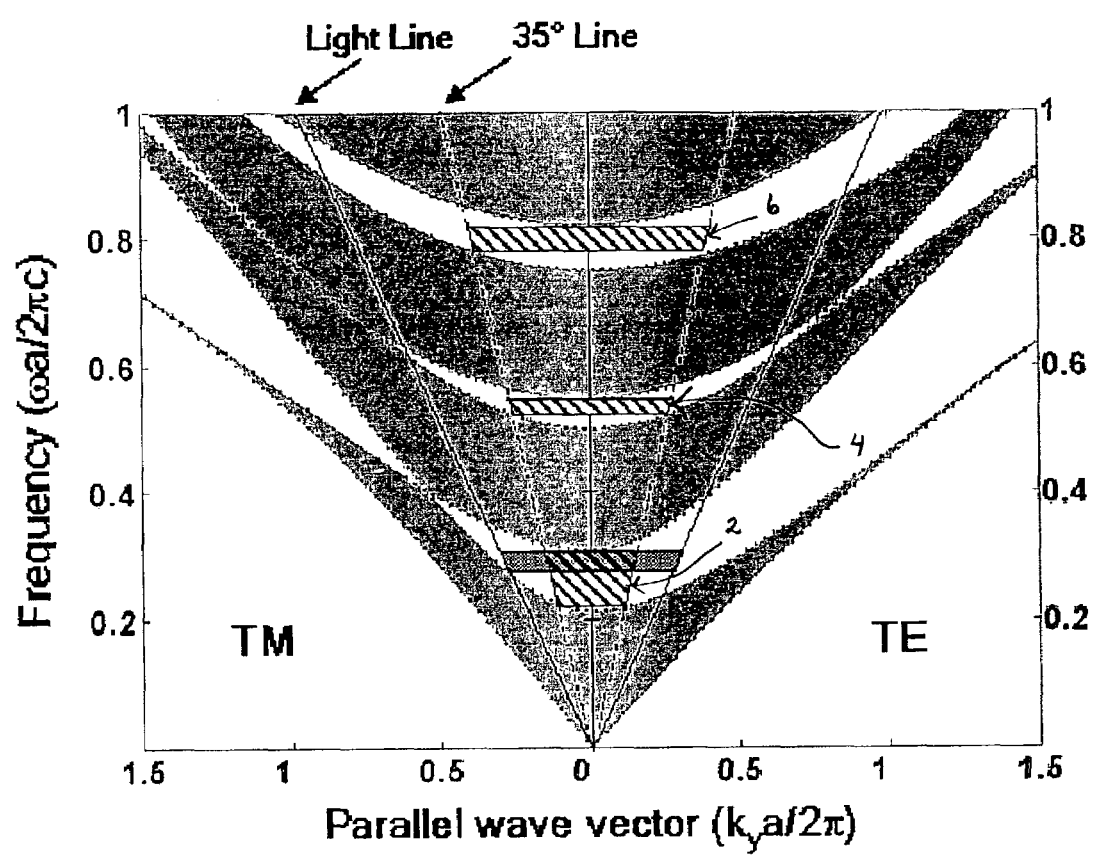
FIG. 2 is a photonic band diagram for a one-dimensional photonic crystal having a periodic refractive index alternating between 2.8 and 1.55.

FIG. 2 is a photonic band diagram for a one-dimensional photonic crystal having a periodic refractive index alternating between 2.8 and 1.55. In theory, predicting the spectral response of these fibers, it is convenient to calculate the photonic band structure that corresponds to an infinite one-dimensional photonic crystal. This allows for the analysis of propagating and evanescent modes in the structure, corresponding to real and imaginary Bloch wave number solutions. The electric field vector is parallel to the mirror layer interfaces for the transverse electric (TE) polarized modes, and likewise the magnetic field vector is parallel to the interfaces for the transverse magnetic (TM) modes. The parallel wave vector ($k_y$) is the vector component of the incident EM wave that is parallel to the layer interfaces. The phase space accessible from an external ambient medium is contained between the light lines that are defined by the glancing-angle condition $\omega = ck_y/n_0$, and the modes between the 35° lines correspond to those sampled experimentally. Axes are normalized to the thickness α of one bilayer with a period consisting one high and one low index layer.

FIG. 2 depicts the photonic band diagram for an infinite structure having similar periodicity and refractive indices to the mirror structures fabricated herein. Three photonic band gaps 2, 4, and 6 are present where high reflectivity is expected within the 0-35° angular ranges, and the fundamental gap contains a range of external omnidirectional reflectivity. The gray regions represent propagating modes within the structure, while the white regions represent evanescent modes. The lower dark shaded trapezoid represents a region of external omnidirectional reflection.

Figures 3A, 3B:
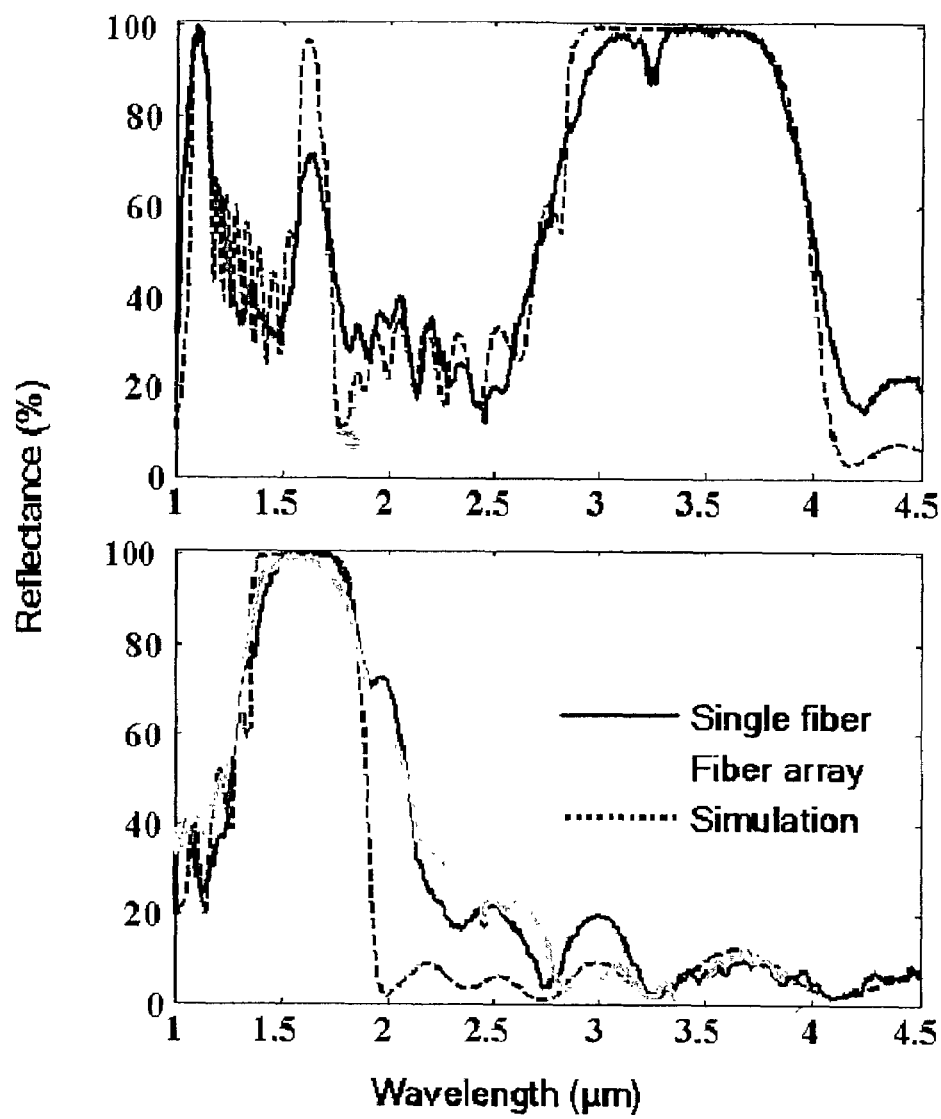
FIGS. 3A-3B are graphs of measured reflectance spectra for a 400 μm OD and 200 μm OD dielectric fiber, respectively, relative to gold-coated fibers of the same diameter.

FIGS. 3A-3B are graphs of measured reflectance spectra for a 400 μm OD and a 200 μm OD dielectric fiber, respectively, relative to gold-coated fibers of the same diameter. The mirror fiber reflectivity is measured from single fibers and parallel fiber arrays using a Nicolet/SpectraTec NicPlan Infrared Microscope and Fourier Transform Infrared Spectrometer (Magna 860). The microscope objective is used to focus on the fibers and has a numerical aperture (NA) of 0.58. This results in a detected cone where the angle of reflection with respect to the surface normal of the structure can vary from normal incidence to approximately 35°, which is determined by the NA of the microscope objective.

The fibers that are drawn to the 400 μm OD exhibit a very strong reflection band centered at a wavelength of 3.5 μm, as shown in FIG. 3A. Measured reflectivity spectra agree well with the transfer matrix method (TMM) simulations where the reflectivity is averaged across the aforementioned angular range including both polarization modes.

The fibers that are drawn to the 200 μm OD show a similar strong fundamental reflection band centered near 1.7 μm, as shown in FIG. 3B. This shifting of the primary photonic band gap clearly illustrates the precise engineering of the reflectivity spectra over a wide frequency range through thermal deformation processing. Strong optical signatures are measurable from single fibers at least as small as 200 μm OD. Fiber array measurements, simultaneously sampling reflected light from multiple fibers, agree with the single fiber results shown in FIG. 3B.

These reflectivity results are strongly indicative of uniform layer thickness control, good interlayer adhesion, and low interdiffusion through multiple thermal treatments. This is confirmed by scanning microscope (SEM) inspections of fiber cross-sections, as shown in FIG. 4, to be discussed hereinafter. In this embodiment, the thickness a for the 400 μm OD fiber is 0.45, and the thickness α for the 200 μm OD fiber is 0.45 μm. The layer thickenesses that are observed correspond well to the measured reflectivity spectra. The fibers have a hole in the center, due to the choice of hollow rod as the preform substrate. The fiber mirror layers have experienced uniform deformation during draw. The rolled-up mirror structure includes a double outer layer of PES for mechanical protection, creating a noticeable absorption peak in the reflectivity spectrum at approximately 3.2 μm, as shown in FIG. 3A.

Figures 4A, 4B, 4C:
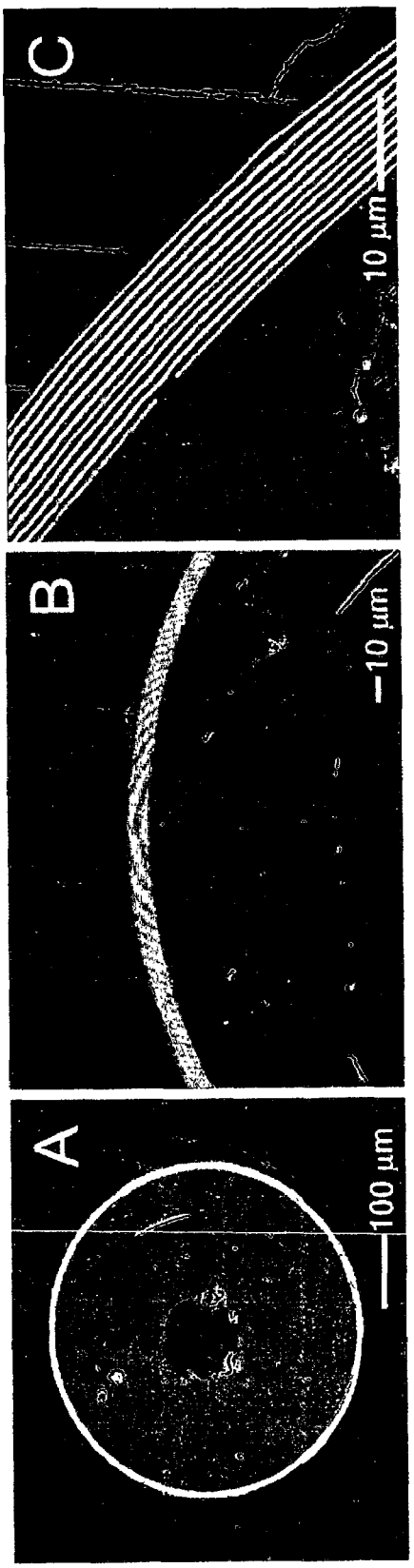
FIGS. 4A-4C are SEM micrographs of a 400 μm OD fiber cross-section.

FIGS. 4A-4C are SEM micrographs of a 400 μm OD fiber cross-section. The entire fiber is embedded in epoxy. FIG. 4A shows the entire fiber cross-section, with a mirror structure surrounding the PES core. FIG. 4B demonstrates that the majority of the fiber exterior is free of significant defects and that the mirror structure adheres well to the fiber substrates. FIG. 4C reveals the ordering and adhesion within the alternating layers of $As_2Se_3$ (bright layers) and PES (dark layers). Stresses that are developed during the sectioning cause some cracks in the mounting epoxy that are deflected at the fiber interface, further demonstrating the mechanical robustness of these mirror-fibers. Fibers from this batch are used in the reflectivity measurements in FIG. 3A.

The combination of the spectral and direct imaging data demonstrates excellent agreement with the photonic band diagram of FIG. 2. This is summarized by comparing the photonic band gap location for the 400 μm OD fibers as shown in FIG. 2, together with the SEM-measured layer spacing of α=0.90 μm, to the empirical spectral reflection data shown in FIG. 3A. The measured gap width range to midrange ratio of the fundamental gap for the 400 μm OD fiber is 27%, compared to 29% in the photonic band diagram.

The matching of rheological behavior in elongation at the draw temperature is a factor to the invention. At the draw temperature, the materials should be fluid enough to elongate without significant stress buildup, yet not so fluid that the mirror layers lose their ordered structure. Thermal expansion coefficient (CTE) plays a role in the adhesion and integrity of thin films during any thermal quenching procedure. PES has a linear CTE of $55 \times 10^{-6}/°$ C., while $As_2Se_3$ has a linear CTE of $25 \times 10^{-6}/°$ C. In the mirror-fiber geometry described herein, this CTE mismatch actually has the effect of strengthening the outer $As_2Se_3$ layers by placing them in compression as the PES layers comprising the bulk of the fiber cools and contracts well below the glass transition of $As_2Se_3$, much like glaze on a typical coated ceramic body is toughened upon cooling from high temperature sintering.

The type of materials and process described hereinbefore can also be applicable for reducing the cost of planar dielectric mirrors, as well as, creating a wide variety of new conformal mirror geometries using various high-throughput processing techniques. These fibers can lead to many new photonic crystal applications involving flexible, woven structures with high reflectivity and a distinct spectral fingerprint.

Figure 5:
FIG. 5 is a cross-section micrograph of a film used to form a chiral waveguide.

FIG. 5 is cross-section schematic of a film used to form a all-dielectric chiral waveguide. In this embodiment, a chiral waveguide structure must not be identical by any rotation except a full 360°. If the plane perpendicular to the fiber is not reproducible by a 180° rotation, then the fiber will have a distinct handedness.

This aspect of the invention describes a fiber with variations in its cross-section. One simple way to induce variations in the cross-section of the fiber is by using a rolling methodology, as discussed hereinbefore. If flexible materials are used, they can be rolled and then drawn. Two identically drawn fibers being rolled in opposite directions will be mirror images of one another and therefore have chirality.

For this rolled and drawn structure to be a waveguide, electromagnetic radiation must be confined within the structure. Several methods can be used to create guided modes within the fiber. The invention provides the ability of a chiral device having a large refractive index contrast between two dielectric materials in a controlled layer structure. Such an omnidirectional reflector has been described in U.S. Pat. No. 6,130,780, incorporated herein by reference. This design can be tuned to any wavelength, thus creating a low loss waveguide. The same cannot be said of a metallic surface, because they strongly absorb in the infrared. For such an omnidirectional reflector to be rolled and drawn, many properties between materials must be compatible.

The chiral waveguide is formed using the same techniques discussed hereinbefore regarding the fibers. In particular, the chiral waveguide uses a chalcogenide glass, such as $As_2Se_3$, and polymers, such as PES or polyetherimide (PEI). The properties of the $As_2Se_3$ can be tuned by the altering the As-Se ratio, as well as, by doping with various elements including but not limited to germanium, tellurium, and sulfur. Doping affects all the properties of $As_2Se_3$, and can therefore be used to fine tune its compatibility with low refractive index materials. The optical properties of $As_2Se_3$ give a broad range over which an omnidirectional reflector can be created. Variations of the molecular weight of PES and PEI can result in the tuning of the properties of these materials as well. Other polymers in the same family and other thermoplastics are also strong candidates for use in these fibers.

Films of PEI or PES are obtained and $As_2Se_3$ is deposited on one side. The resulting films are then heated and drawn. The drawn films maintain coherency, as no cracks are evident in the thin $As_2Se_3$ film, as shown in FIG. 5. In particular, FIG. 5 shows one of the drawn films demonstrating its thermomechanical compatibility. The refractive index of PES is listed as 1.65, by Goodfellow Corporation. PEI is expected to have a similar refractive index.

$As_2Se_3$ can be deposited by methods including, but not limited to, thermal evaporation, chemical vapor deposition, and sputtering. The PES and PEI can be made into thin freestanding films, dipcoated, and spincoated. The large variety of processing techniques allows various devices to be made out of these materials. For example, an evaporation/dipcoating technique can be used to create a non-chiral ommidirectionally reflective fiber waveguide. An evaporation/spincoating technique can be used to create an one-dimensional omnidirectionally reflective stacks, which can then be heated and molded into shapes and tuned to various frequencies post-production. A two-dimensional photonic crystal fiber preform can be fabricated and drawn down.

Figure 6:
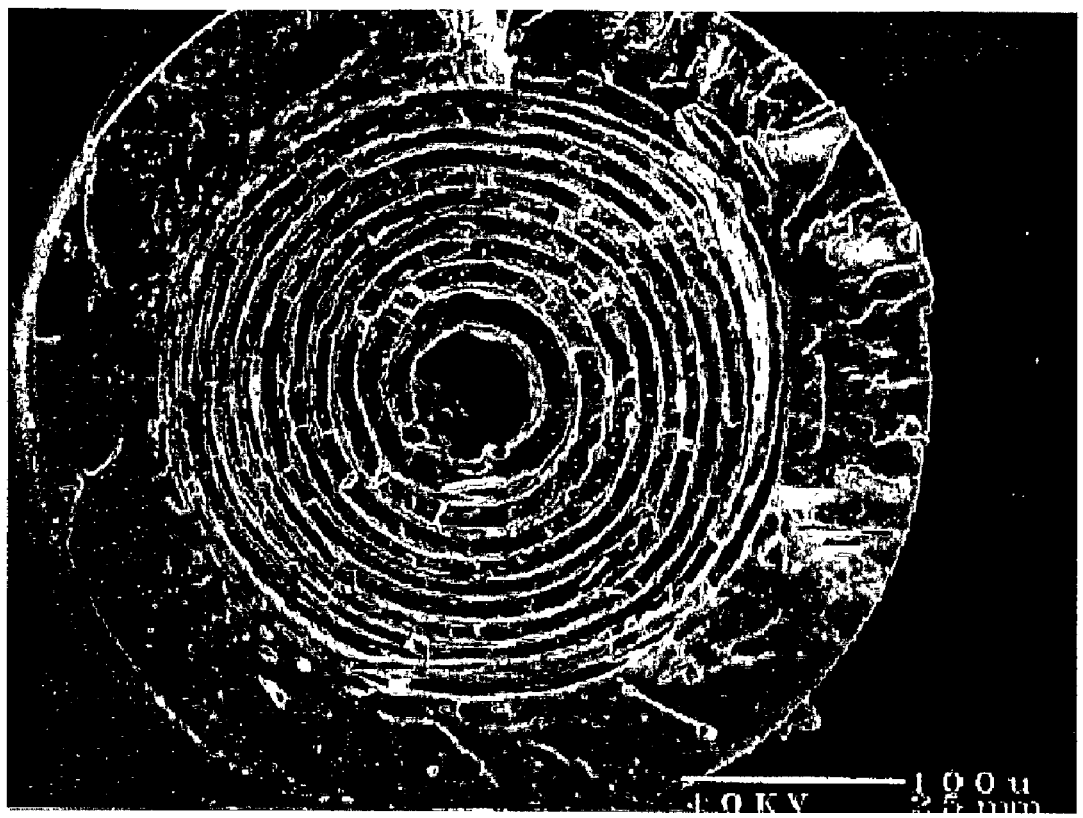
FIG. 6 is a micrograph of a PES-$As_2Se_3$ drawn fiber.

FIG. 6 is a micrograph of a PES-$As_2Se_3$ drawn fiber. A rolling methodology is used for forming a preform that includes the step of production or acquisition of a thin film polymer, such as PES or PEI and the subsequent deposition on the thin film polymer of a high refractive index material, such as $As_2Se_3$ or other chalcogenide glass. The film is rolled into a preform structure. The preform is then consolidated. The consolidated preform is heated and drawn to produce fibers, as shown in FIG. 6. The rolling of the multilayer film into the fiber preform produces a spiral form for the layers in cross-section. The cross-sectional view of FIG. 6 shows the spiral form after the preform has been drawn to form the fiber. The aforementioned steps may not all be necessary depending on the materials system that is selected, but they are listed as a general approach to producing rolled fibers.

An example of these steps is given by a system made from PES and $As_2Se_3$, as shown in FIG. 6. It is important to note that is an exemplary embodiment, and other embodiments can use different material compositions. The freestanding polymer film of PES, with a thickness of 25 µm, is obtained and coated via thermal evaporation with a 2 µm film of $As_2Se_3$ on both sides. The thicknesses can be varied and coating can be applied on one or both sides. Also, it is conceivable that more than two materials can be used. The film is then rolled tightly and then held together with a wrapping of Teflon tape. Many methods exist for rolling films and this is just one example of such a technique. Many other methods can be used to a rolled photonic crystal fiber.

After rolling, the preform is condensed to remove air trapped in the interfaces between the adjacent layers. To do this, the preform is heated in a vacuum oven at approximately 250° C. for approximately 18 minutes. The vacuum oven is then repressurized while still hot and the preform is removed and cooled in a freezer. There are other ways to conduct this process including using a conventional oven or other cooling techniques.

After consolidation, the capillary tube is etched out with hydrofluoric acid leaving a freestanding multilayer rolled preform. The etch is conducted for approximately 1 hour. The preform is then drawn down about 5 times at approximately 250° C. to yield a chiral photonic crystal fiber. Cross sectional samples are cut and coated for examination with a scanning microscope.

FIG. 6 shows a micrograph of a cross-section of the drawn fiber. It is clear that the cross-section is not reproducible by any rotation other than a multiple of 360°, so any axial variation in the fiber will result in a chiral structure.

An alternative method for producing a chiral waveguide would be with a sequential thin film deposition. A pair of thermomechanically compatible materials can be both deposited via thin film processing techniques. Here a mask can be used to expose a small portion of a cylindrical substrate. The first materials can be deposited and, without the rotation of the mask, the second materials can be deposited. The substrate can then be rotated and the process repeated. The final structure will appear identical to a rolled preform.

A simple rolled or a drawn waveguide without variations in the axial direction can also provide some benefits. While the structure is not chiral, this method provides an easy and cost effective technique for producing low loss optical fibers. If the core size of the fiber is large relative to the wavelength of light, it is possible that the rolled structure will have no affect on the light beyond that of a perfectly cylindrical photonic crystal fiber. For small core fibers, novel effects are possible due to the lack of infinite rotational symmetry in the fiber cross section. Due to the loss of this symmetry, angular momentum will no longer be conserved resulting in novel mode structures within the fiber.

Although the present invention has been shown and described with respect to several preferred embodiments thereof, various changes, omissions and additions to the form and detail thereof, may be made therein, without departing from the spirit and scope of the invention.

What is claimed is:

1. A mirror structure comprising a fiber having a cross-section with a plurality of features arranged in a spiral form in the cross-section, said features arranged by rolling a multilayer structure comprising a glass-coated polymer film into the spiral form.

2. An ordered structure comprising a fiber having a cross-section with a plurality of features of a defined size arranged in a spiral form in the cross-section, said features including multiple spatial units of a glass and a polymer that are formed by rolling a multilayer structure comprising a glass-coated polymer film into the spiral form, wherein said spatial units are of size between 1 nanometer and 20000 nanometers.

3. The structure of claim 1, wherein the glass is a chalcogenide glass.

4. The structure of claim 1, wherein the polymer is a thermoplastic polymer.

5. The mirror structure of claim 1, wherein said features are arranged in a periodic form.

6. The mirror structure of claim 1, wherein said features are arranged in a pseudo-periodic fashion.

7. The mirror structure of claim 3, wherein said chalcogenide glass is comprised of arsenic triselenide.

8. The mirror structure of claim 4, wherein said thermoplastic polymer is comprised of PES.

9. The mirror structure of claim 1, wherein said features are comprised of alternating layers of the glass and the polymer.

10. The mirror structure of claim 1, wherein the glass-coated polymer film is formed by depositing a layer of the glass on said polymer film.

11. The mirror structure of claim 9, wherein said alternating layers of the glass are formed or bonded into the multilayer structure using thermally-assisted processes.

12. The mirror structure of claim 11, wherein said alternating layers of the glass are reduced in size through drawing.

13. The mirror structure of claim 11, wherein said alternating layers of the glass are formed by placing said multilayer structure in a draw tower at a specified temperature and drawing into said structure having smaller resulting dimensions.

14. The mirror structure of claim 9, wherein said alternating layers of the glass are formed by placing said multilayer structure in a draw tower and drawing into said structure.

15. The mirror structure of claim 1, wherein said features are formed or bonded into the multilayer structure using thermally-assisted processes.

16. The ordered structure of claim 2, wherein the glass is a chalcogenide glass and the polymer is a thermoplastic polymer and said features are comprised of alternating layers of the chalcogenide glass and the thermoplastic polymer.

17. The ordered structure of claim 2, wherein said glass-coated polymer film is formed by depositing a layer of the glass on said polymer film.

18. The ordered structure of claim 16, wherein said alternating layers of chalcogenide glass are formed or bonded into the multilayer structure using thermally-assisted processes.

19. The ordered structure of claim 18, wherein said alternating layers of chalcogenide glass are reduced in size through drawing.

20. The ordered structure of claim 18, wherein said alternating layers of chalcogenide glass are formed by placing said multilayer structure in a draw tower at a specified temperature and drawing into said structure having smaller resulting dimensions.

21. The ordered structure of claim 16, wherein said alternating layers of chalcogenide glass are formed by placing said multilayer structure in a draw tower and drawing into said structure.

22. The ordered structure of claim 2, wherein said features are formed or bonded into a multilayer structure using thermally-assisted processes.

23. The structure of claim 1, wherein the cross-section is perpendicular to a longitudinal axis of the fiber.

24. The structure of claim 1, wherein the multilayer structure is planar prior to being rolled.

25. The structure of claim 2, wherein the cross-section is perpendicular to a longitudinal axis of the fiber.

26. The structure of claim 2, wherein the multilayer structure is planar prior to being rolled.

* * * * *